(12) United States Patent
Walraven et al.

(10) Patent No.: US 8,746,632 B2
(45) Date of Patent: Jun. 10, 2014

(54) RISER CLAMP WITH VIBRATION ISOLATION

(75) Inventors: Jan van Walraven, Mijdrecht (NL); Marek Juzak, Mijdrecht (NL)

(73) Assignee: J. Van Walraven Holding B.V., Mijdrecht (NL)

( * ) Notice: Subject to any disclaimer, the term of this patent is extended or adjusted under 35 U.S.C. 154(b) by 77 days.

(21) Appl. No.: 13/125,148

(22) PCT Filed: Oct. 22, 2008

(86) PCT No.: PCT/NL2008/000238
§ 371 (c)(1),
(2), (4) Date: Apr. 20, 2011

(87) PCT Pub. No.: WO2010/047578
PCT Pub. Date: Apr. 29, 2010

(65) Prior Publication Data
US 2011/0198475 A1 Aug. 18, 2011

(51) Int. Cl.
*F16L 3/00* (2006.01)

(52) U.S. Cl.
USPC .............................. 248/62; 248/74.1; 248/67.7

(58) Field of Classification Search
USPC ......... 248/615, 677, 680, 231.61, 154, 316.6, 248/229.14, 229.24, 228.5, 230.5, 218.4, 248/229.22, 227.3, 230.1, 231.85, 539, 540, 248/541, 62, 63, 67.7, 74.1; 267/141
See application file for complete search history.

(56) References Cited

U.S. PATENT DOCUMENTS

| | | | | |
|---|---|---|---|---|
| 1,173,538 A * | 2/1916 | Roberts | | 248/615 |
| 2,404,531 A | 7/1946 | Robertson | | |
| 5,727,762 A * | 3/1998 | Cosentino | | 248/231.61 |
| 6,484,374 B2 * | 11/2002 | McAllister | | 24/557 |
| 7,655,320 B2 * | 2/2010 | Keener et al. | | 428/626 |
| 7,938,376 B2 * | 5/2011 | Jimenez et al. | | 248/316.7 |
| 2006/0011800 A1 * | 1/2006 | Lagsdin | | 248/615 |
| 2009/0266944 A1 * | 10/2009 | Mominee et al. | | 248/67.7 |
| 2009/0272855 A1 * | 11/2009 | Oram | | 248/67.5 |

FOREIGN PATENT DOCUMENTS

EP 1 909 011 A2 4/2008

* cited by examiner

*Primary Examiner* — Steven Marsh
(74) *Attorney, Agent, or Firm* — Browdy and Neimark, PLLC

(57) ABSTRACT

A riser clamp (1) has two opposed clamp halves (2, 3), each of said clamp halves (2, 3) having a semicircular section (21, 31) opposing the semicircular section of the other clamp half for surrounding a riser pipe. Each of said clamp halves has at the ends of its semicircular section radially extending clamp flanges (22, 32) to be clamped against the corresponding opposing clamp flanges of the other clamp half. The riser clamp (1) is in use supported from beneath by a support surface. At least one of two opposing clamp flanges is provided with an isolation member (4) comprising a resilient support strip (41), which support strip (41) is located below the corresponding clamp flange for resiliency supporting it. The isolation member (4) further comprises at least one web (42) extending upwardly from the support strip (41) along the corresponding clamp flange, wherein said web (42) is attached to the corresponding clamp flange.

21 Claims, 3 Drawing Sheets

RISER CLAMP WITH VIBRATION ISOLATION

FIELD OF THE INVENTION

The present invention relates to a riser clamp and a vibration isolation member therefor.

A conventional riser clamp is tightened around a riser pipe, also referred to as a riser, using fasteners to either side of the circular portion defined by two semicircular sections. The straight sections to either side of the semicircular portion extend for a substantial distance. This extension is to insure that both straight sections of the clamp will extend to the floor for support around a hole created for passage of the riser therethrough. The fasteners are typically tightened to give very substantial compressive stress in order that the friction between the clamp and the heavy steel riser will retain the riser in place.

Since the riser clamps are resting on the floor they will transfer noise and other vibrations from the riser to the floor and the surrounding structure. To avoid transfer of vibrations it is known from the prior art to place a loose vibration isolating pad below the straight sections of the clamp for supporting the straight sections of the riser clamp. Such pads can be found on the market e.g. under the trademark Holdrite® by Hubbard Enterprises.

A disadvantage of the known vibration isolating pads is that they have to be placed very precise. As the pads are loose components that can readily be positioned falsely it can occur that the straight section of the clamp in one spot is still touching the floor, thereby neutralising the effect of the pad. This can for instance happen during installation or tightening of the clamp when it can still be rotated around the riser pipe.

The present invention has for an object to provide a riser clamp which obviates this disadvantage.

Another object of the invention is to provide a riser clamp wherein the fasteners cannot be lost.

Yet another object of the present invention is to provide a vibration isolating member for such a riser clamp.

SUMMARY OF THE INVENTION

In one aspect the invention provides a riser clamp having two opposed clamp halves, each of said clamp halves having a semicircular section opposing the semicircular section of the other clamp half for surrounding a riser pipe. Each of said clamp halves has at the ends of its semicircular section radially extending clamp flanges to be clamped against the corresponding opposing clamp flanges of the other clamp half. The riser clamp is in use supported from beneath by a support surface. At least one of two opposing clamp flanges is provided with an isolation member comprising a resilient support strip. The support strip is located below the corresponding clamp flange for resiliently supporting it. The isolation member further comprises at least one web extending upwardly from the support strip along the corresponding clamp flange, wherein said web is attached to the corresponding clamp flange.

In another aspect the invention provides an isolation member for a riser clamp, which in use is supported from beneath by a support surface. Such a riser clamp has two opposing clamp halves, each clamp half having a semicircular section opposing the semicircular section of the other clamp half for surrounding a riser pipe. Each clamp half having at the ends of the semicircular section radially extending clamp flanges to be clamped against the opposing clamp flanges of the other clamp half. The isolation member is adapted to be provided on a clamp flange of the riser clamp half. The isolation member comprises a resilient support strip, which support strip is adapted to be located between said support surface and the lower edge of the clamp flange for resiliently supporting said clamp flange. The support strip having an upper side and a lower side wherein the isolation member further comprises at least one web extending upwardly from the upper side of the support strip. The web has a lower end connected to the support strip and has an upper end with an upper retaining means for engaging an upper edge of the clamp flange.

DETAILED DESCRIPTION OF THE PREFERRED EMBODIMENTS

Figure 1:
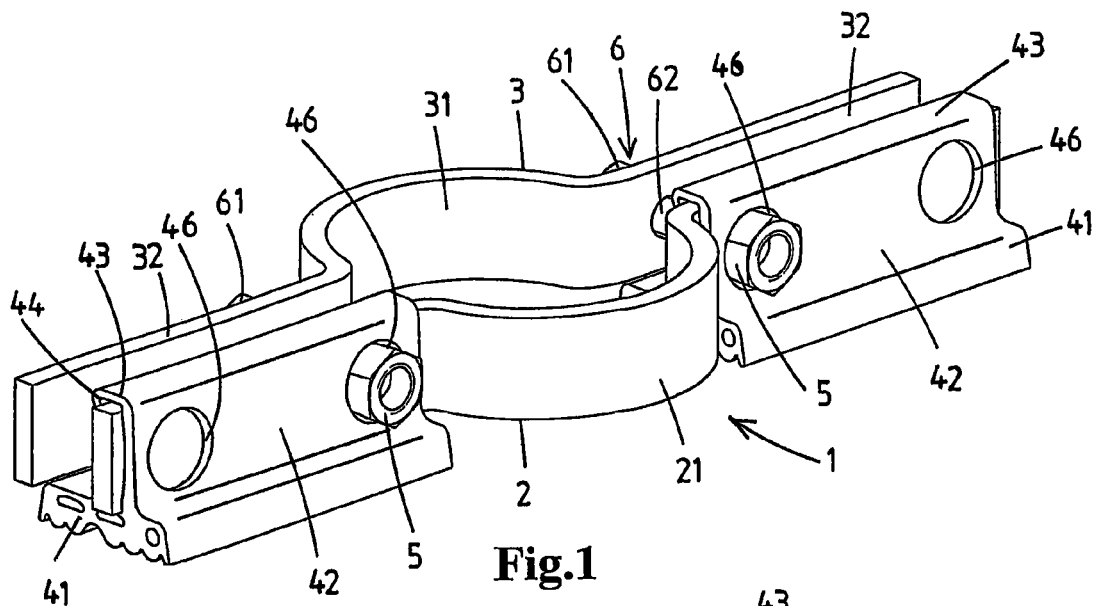
FIG. 1 shows in a perspective view a preferred embodiment of a riser clamp according to the invention.
Figure 2:
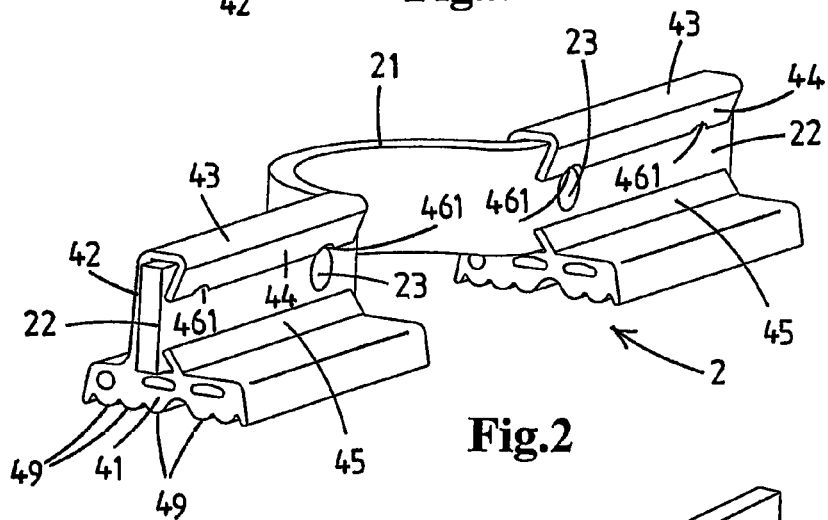
FIG. 2 shows in a perspective view a first clamp half of the riser clamp of FIG. 1.
Figure 3:
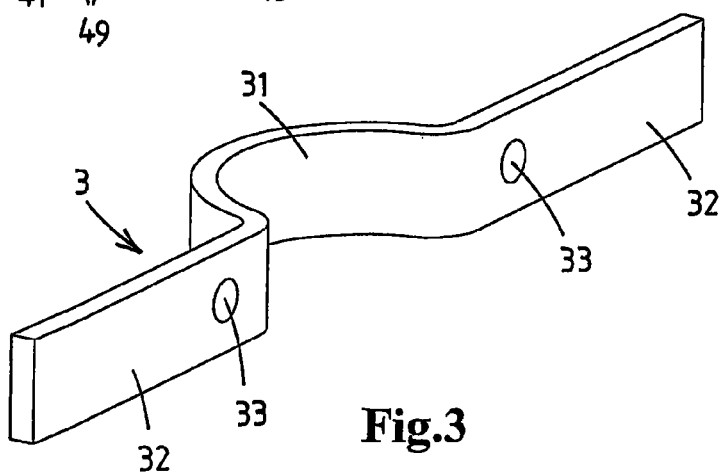
FIG. 3 shows in a perspective view a second clamp half of the riser clamp of FIG. 1.

Referring to FIG. 1 is shown a riser clamp 1. The riser clamp 1 comprises a first riser clamp half 2, which is shown in FIG. 2, and a second riser clamp half 3, which is shown in FIG. 3. The first riser clamp half 2 has a semicircular section 21 and two straight sections 22 extending radially from the respective ends of the semicircular section 21 made out of metal strip. The second riser clamp half 3 has a semicircular section 31 and two straight sections 32 extending radially from the respective ends of the semicircular section 31 made out of metal strip. Alternatively the riser clamp halves 2 and 3 can be made of another suitable material.

In use the semicircular sections 21 and 31 are placed on opposite sides of a riser pipe and the opposed straight sections 22 and 32 are brought in engagement with each other. In the following the straight sections 22 and 32 will be referred to as clamp flanges 22 and 32. The clamp flanges 22 and 33 are provided with holes 23, 33 respectively for running through a shaft of a bolt, screw or other suitable tightening means.

Figure 4:
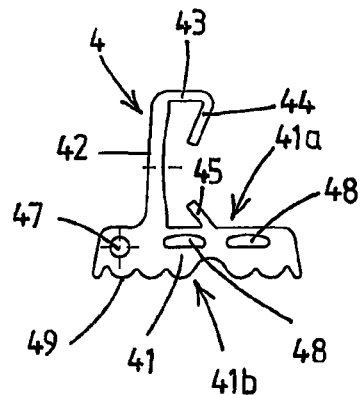
FIG. 4 shows a cross section of a vibration isolating member for the riser clamp of FIG. 1.

In the shown preferred embodiment the first riser clamp half 2 is on either of the two flanges 22 provided with a vibration isolation member 4 as can be seen in FIGS. 1 and 2. The vibration isolation member 4 is shown separate from the first clamp half 2 in FIGS. 4-6.

The vibration isolation member 4 comprises a support strip 41 with an upper side 41a and a lower side 41b. The isolation strip can have longitudinal channels 47, 48 extending through the strip 41, which improve the dampening effect of the support strip 41. Furthermore, the lower side 41b of the support strip 41 may be provided with longitudinal ribs 49 as is shown in the drawings for enhancing the vibration isolation properties of the support strip 41.

The isolation member 4 furthermore comprises a web 42 which extends upwardly from the upper side 41*a* of the resilient strip 41. The web 42 extends substantially perpendicular with regard to the upper side 41*a* of the resilient strip 41. An upper retaining means essentially configured as a hook means is provided on the upper side of the web. The hook means has a leg 43 extending substantially parallel with the support strip 41 and a resilient flange 44 that extends downwardly and is inclined to the web 42. On the upper side 41*a* of the support strip 41 may be provided a resilient locking lip 45 as is shown in FIG. 2 and FIGS. 4-6, but an embodiment without a locking lip 45 is also possible. The locking lip 45 is spaced apart from the web 42 and extends in an inclined manner from the upper side 41*a* of the support strip towards the web 42. In the web are provided two passing holes 46.

The vibration isolating member 4 can be made out of rubber or another elastomeric material, preferably by means of extrusion. The extruded profile is then cut to the desired length and the holes 46 are be punched in the web 42.

Figure 5:
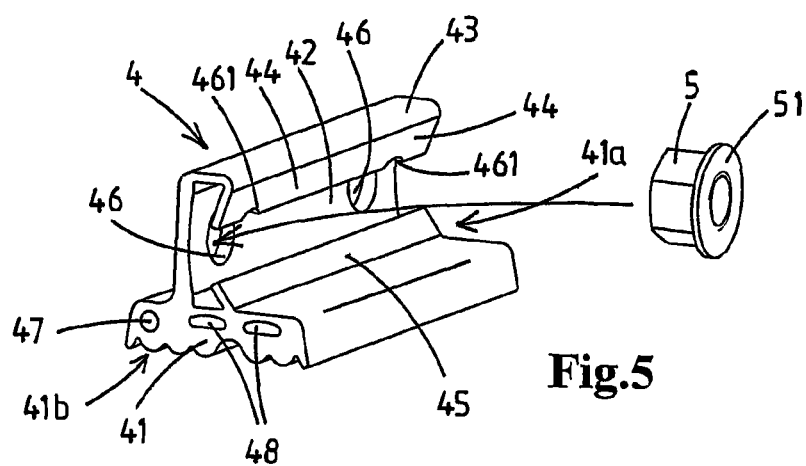
FIG. 5 illustrates in a perspective view how a nut is installed in the vibration isolating member of the riser clamp of FIG. 1.
Figure 6:
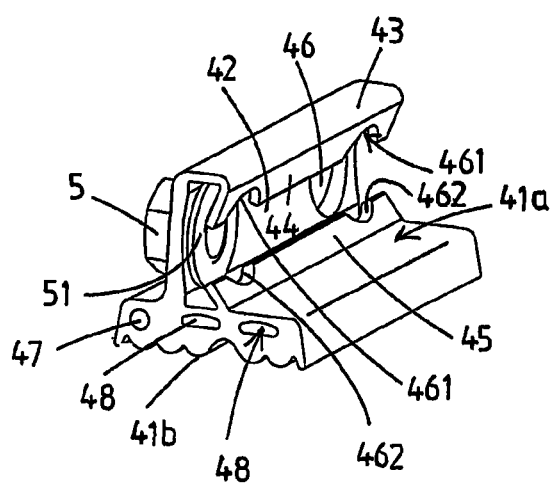
FIG. 6 shows in a perspective view a variation on the vibration isolating member of the riser clamp of FIG. 1 with an installed nut.

In the preferred embodiment a screw nut 5 is fitted in one of the passing holes 46 as is illustrated in FIGS. 5 and 6. The nut 5 has a larger diameter than the diameter of the passing hole 46, whereby the nut 5 is tightly held in the hole due to the resiliency of the web material. The nut 5 has at one end thereof a collar 51, which engages the web when the nut is located properly in the hole 46.

During assembly, the underside of the flange 22 of the first clamp half 2 is placed on the support strip 41 between the lower end of the web 42 and the locking lip 45. The upper side of the flange 22 is placed against the leg 43 between upper end of the web 42 and the flange 44. Due to the resiliency of the vibration isolating material of member 4 the locking lip 45 and the resilient flange 47 the flange 22 is clamped between the web 42 and the resilient flange 44 and lip 45.

The collar 51 of the nut is located between the web 42 and the flange 22, thereby retaining the nut in the hole 46 and preventing the loss of the nut 5. Retaining the nut 5 against the flange 22 of the first clamp half 2 provides the advantage that no loose nuts have to be used which in practise is often cumbersome and inpractical since the nuts have to be held when a bolt shank is run through the holes 23, 33 and the nuts are often lost.

As can be seen in the figures the holes 23 and 33 in the flanges 22 and 32 are relatively close to the semicircular sections 21 and 31 to clamp the clamp halves 2 and 3 around a riser pipe. The flanges 22, 32 have a sufficient length to support the riser pipe on the support surface such as a floor. In a preferred embodiment the vibration isolation member 4 is provided with two passing holes 46 such that the vibration isolation element 4 can be used on either flange 22 of the clamp half 2, which has the advantage that one single embodiment of isolation member 4 has to be made.

In FIGS. 5 and 6 is shown that the resilient flange 44 at the location opposite the passing holes 46 in the web is provided with recesses 461, in particular shaped as a circle segment. In the varying embodiment of the isolating member 4 shown in FIG. 6 also the locking lip is provided with recesses 462 at the location opposite the passing holes 46. The recesses 461 and 462 facilitate mounting the nut 5 in the isolation member 4 in that the collar 51 can be more easily passed into the space between the web 42 and the locking lip 45 and the resilient flange 44.

During assembly of the riser clamp 1 around a riser pipe, the first clamp half 2 provided with the vibration isolation members 4 and second clamp half 3 are placed diametrically opposite each other against the riser pipe. The second clamp half 3 is placed with its flanges 32 on the supporting strips 41 of the isolating members 4. Therereto the support strip 41 has a width that is sufficient to support two opposing flanges 22, 32.

A bolt 6 with a head 61 and a shank 62 is provided. The bolt shank 62 is passed through the opposing holes 23 and 33 in the opposing flanges 22 and 32 and screwed into the nut 5. The clamp halves are tightened around the riser pipe by tightening the bolt 6. The bolt 6 may be provided with an anti-loss ring (not shown) which is provided on the schank 62 after it is passed through the holes 33. This anti-loss ring may be a elastomeric ring that tightly surrounds the shank 62. With the anti-loss ring the bolt 6 can be pre-assembled and packed. The riser clamp 1 can thus be packed with a minimum of loose parts.

It is noted that in the shown preferred embodiment a bolt with a nut is used to tighten the clamp halves together. It will however be obvious to a skilled person that a screw can be used which is screwed into a threaded hole in on of the opposing flanges 22 or 32. The nut 5 is then omitted. Also other suitable fastening means are conceivable for a skilled person and are deemed falling within the invention.

In a variation on the preferred embodiment shown in FIG. 1, each of the clamp halves 2 and 3 is provided with one isolation member 4, such that each pair of opposing flanges 22, 32 has one isolation member 4 to support them.

Figure 7:
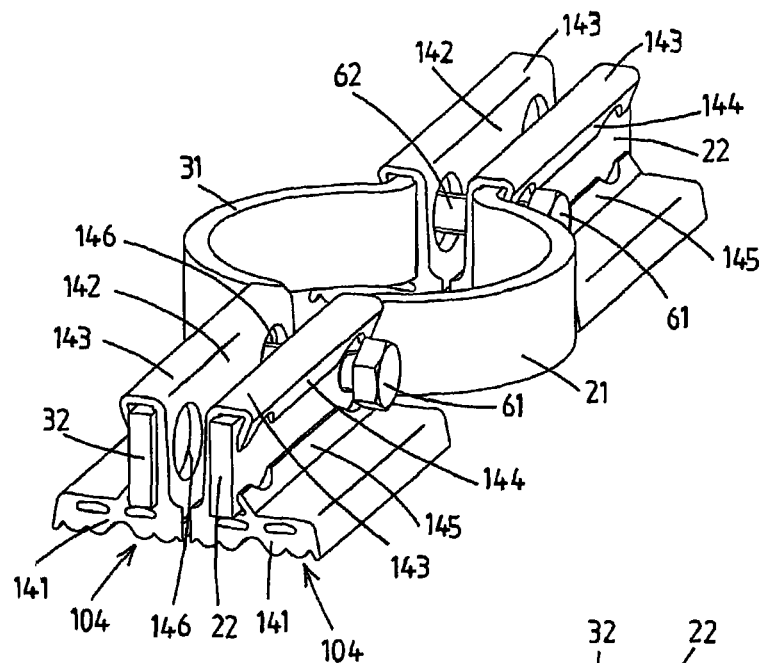
FIG. 7 shows in a perspective view another preferred embodiment of a riser clamp according to the invention.

In yet another possible embodiment which is shown in FIG. 7 each of said opposing clamp flanges 22, 32 is provided with their own isolation member 104 comprising a resilient support strip 141 which extends below the corresponding clamp flange 22, 32 of the clamp half 2, 3 for resiliently supporting said clamp flange 22, 32. The isolation member 104 has substantially the same configuration as the isolation member 4 described above with reference to FIGS. 1-2 and 4-6. The elements of the isolation member 104 that correspond to the elements of isolation member 4 are indicated by the same reference numerals but with "100" added. The only difference between the two isolation members 4 and 104 is that the support strip 141 of the isolation member 104 extends less on one side of the web 142, such that the flanges 22, 32 of the clamp halves 2, 3 can be brought together close enough to allow the clamp to be clamped around the riser pipe.

Figure 8:
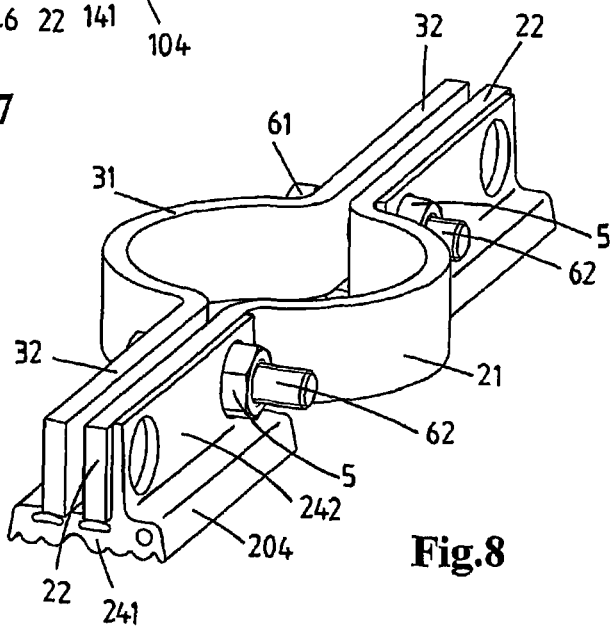
FIG. 8 shows in a perspective view yet another preferred embodiment of a riser clamp according to the invention.
Figure 9:
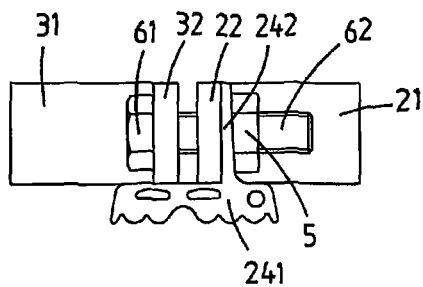
FIG. 9 shows a side elevational view of the riser clamp of FIG. 8.

In still another possible embodiment, which is shown in FIG. 8 and FIG. 9, an isolation member 204 is provided which has a support strip 241 and an upstanding web 242 which is adhered to the corresponding clamp flange 22 by means of a suitable adhesive or by means of vulcanisation. In this embodiment the hook means (the leg 43, 143 and the resilient lip 44, 144) on the upper end of the web and the locking lip 45, 145 which are present in the embodiments described above can in principle be dispensed with.

The invention claimed is:

1. Isolation member for a riser clamp, which in use is supported from beneath by a support surface, said riser clamp having two opposing clamp halves, each clamp half having a semicircular section opposing the semicircular section of the other clamp half for surrounding a riser pipe, and each clamp half having at the ends of the semicircular section radially extending clamp flanges to be clamped against the opposing clamp flanges of the other clamp half, wherein the isolation member is adapted to be provided on a clamp flange of the riser clamp half, the isolation member comprising a resilient support strip, which support strip is adapted to be located between said support surface and the lower edge of the clamp flange for resiliently supporting said clamp flange, the support strip having an upper side and a lower side wherein the isolation member further comprises at least one web extending upwardly from the upper side of the support strip, the web having a lower end connected to the support strip and having an upper end with an upper retaining means for engaging an upper edge of the clamp flange.

2. Isolation member according to claim 1, wherein the support strip has a width such that when the opposing clamp halves are clamped together it extends below two opposing clamp flanges for resiliently supporting said clamp flanges.

3. Isolation member according to claim 1, wherein a resilient locking lip is provided on the upper side of the support strip at a distance of the web, such that the lower end of the clamp flange can be received between the web and the locking lip.

4. Isolation member according to claim 1, wherein the upper retaining means is constituted by a leg extending substantially parallel with the support strip for engaging the upper edge of the clamp flange, and a downwardly extending resilient flange.

5. Isolation member according to claim 1, wherein the web is provided with at least one hole for passing through tightening members for tightening the opposing clamp flanges together.

6. Isolation member according to claim 3, wherein the web is provided with at least one hole for passing through tightening means for tightening the opposing clamp flanges together, and wherein at least one recess is provided in the resilient locking lip for allowing a tightening member to pass.

7. Isolation member according to claim 4, wherein the web is provided with at least one hole for passing through tightening means for tightening the clamp flanges together, and wherein at least one recess is provided in the downwardly extending resilient flange for allowing a tightening member to pass.

8. Isolation member according to claim 1, which basically is an extruded profile from an elastomeric material.

9. Isolation member according to claim 5, wherein a nut is provided that is fitted in the hole in the web.

10. Isolation member according to claim 9, wherein the nut has a collar which engages the web around said hole on the side of the web facing the corresponding clamp flange, such that the collar of the nut in use is located between said web of the isolation member and said clamp flange.

11. Riser clamp having two opposed clamp halves, each of said clamp halves having a semicircular section opposing the semicircular section of the other clamp half for surrounding a riser pipe, and each of said clamp halves having at the ends of its semicircular section radially extending clamp flanges to be clamped against the corresponding opposing clamp flanges of the other clamp half, said riser clamp in use to be supported from beneath by a support surface,
wherein at least one of two opposing clamp flanges is provided with an isolation member comprising a resilient support strip, which support strip is located below the corresponding clamp flange for resiliently supporting it,
said isolation member further comprising at least one web extending upwardly from the support strip along the corresponding clamp flange, wherein said web is attached to the corresponding clamp flange.

12. Riser clamp according to claim 11, wherein the support strip has a width such that when the opposing clamp halves are clamped together it extends below the two opposing clamp flanges for resiliently supporting said clamp flanges.

13. Riser clamp according to claim 11, wherein each of said opposing clamp flanges is provided with their own isolation member comprising a resilient support strip which extends below the corresponding clamp flange of the clamp half for resiliently supporting said clamp flange.

14. Riser clamp according to claim 11, wherein the web has a lower end connected to the support strip and an upper end with an upper retaining means for engaging on an upper edge of the corresponding clamp flange.

15. Riser clamp according to claim 14, wherein a resilient locking lip is provided on the support strip at a distance of the web, the lower end of the corresponding clamp flange being received between the web and the locking lip.

16. Riser clamp half according to claim 11, wherein the web is adhered to said corresponding clamp flange.

17. Riser clamp according to claim 11, wherein said clamp flange that is provided with the isolating member is provided with at least one hole for passing through a tightening member and the web of the isolating member is provided with at least one hole which is in line with said hole in said clamp flange for passing through a tightening member for tightening the opposing clamp halves together.

18. Riser clamp according to claim 17, wherein a nut is provided, which nut is fitted in said hole in the web and engages the clamp flange on a side facing away from the opposing clamp flange and wherein said opposing flange is provided with a through hole which a bolt extends for cooperating with said nut so as to tighten the two opposing flanges together.

19. Riser clamp half according to claim 18, wherein the nut has a collar which engages the web on the side of the web facing the corresponding clamp flange, such that said collar is enveloped between said web of the isolation member and said corresponding clamp flange.

20. Isolation member according to claim 11, wherein the web is provided with at least one hole for passing through tightening means for tightening the opposing clamp flanges together, and wherein at least one recess is provided in a resilient locking lip for allowing a tightening member to pass.

21. Isolation member according to claim 14, wherein the upper retaining means is constituted by a leg extending substantially parallel with the support strip for engaging the upper edge of the clamp flange, and a downwardly extending resilient flange, wherein the web is provided with at least one hole for passing through tightening means for tightening the clamp flanges together, and wherein at least one recess is provided in the downwardly extending resilient flange for allowing a tightening member to pass.

* * * * *